United States Patent [19]
Pothier

[11] 3,713,156
[45] Jan. 23, 1973

[54] SURFACE AND SUBSURFACE DETECTION DEVICE

[76] Inventor: Robert G. Pothier, Oak Hill Drive, Amherst, N.H. 03031

[22] Filed: Oct. 12, 1970

[21] Appl. No.: 80,066

[52] U.S. Cl. .................................343/17, 343/6 ND
[51] Int. Cl. ..............................G01s 9/02, G01s 9/64
[58] Field of Search.......................................343/17

[56] References Cited

UNITED STATES PATENTS

| | | | |
|---|---|---|---|
| 3,050,725 | 8/1962 | Kuecken | 343/17 |
| 3,122,742 | 2/1964 | Hovannesian et al. | 343/17 |
| 3,403,399 | 9/1968 | Jacobs et al. | 343/17 |

Primary Examiner—T. H. Tubbesing
Attorney—Robert R. Hubbard

[57] ABSTRACT

Detector apparatus in which the target area is illuminated by microwave energy in the millimeter range. A microwave lens element focuses the reflected millimeter waves to a focal plane. A microwave to thermal converter is disposed in the focal plane to convert the reflected microwave images to thermal images. A liquid crystal display or an IR area detector, such as a line scan unit is employed to convert the thermal images to a visible display of images in the target area.

9 Claims, 4 Drawing Figures

PATENTED JAN 23 1973    3,713,156
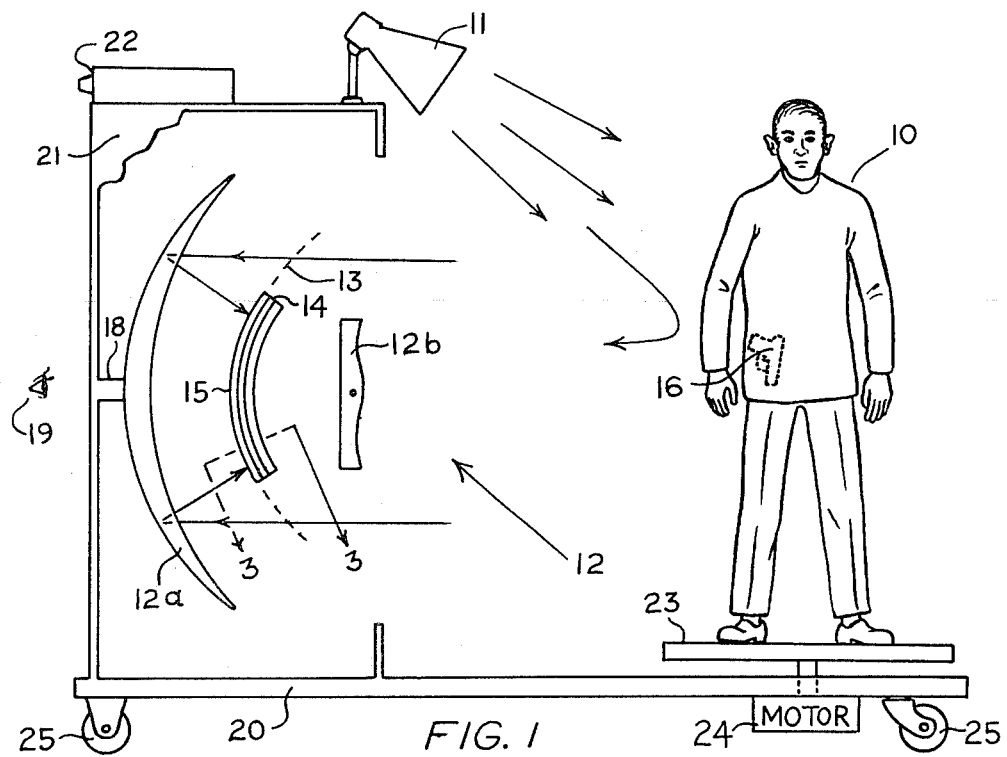
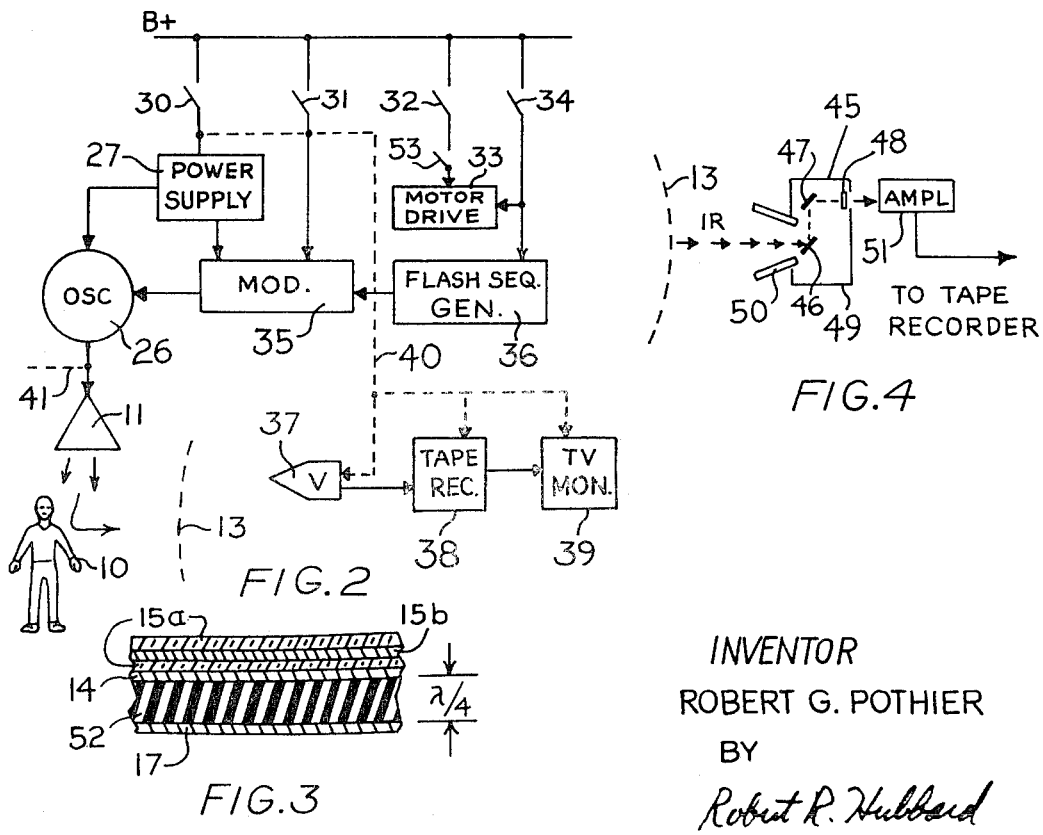
INVENTOR
ROBERT G. POTHIER
BY
Robert R. Hubbard
ATTORNEY

SURFACE AND SUBSURFACE DETECTION DEVICE

BACKGROUND OF INVENTION

1. Field of Invention

This invention relates to detection apparatus and in particular to apparatus for detecting substances which are concealed from view. Detection apparatus of this type is useful in any situation where it is desired to detect and/or identify concealed objects or substances. By way of example, detection apparatus of this type can be employed to detect and identify weapons which are concealed or hidden by a person's clothing or by suitcases or other containers for security inspection at governmental facilities, military facilities, transportation terminals, industrial plants, commercial facilities, and the like. As another example, concealed object detection apparatus can be employed for product inspection purposes on assembly lines. As still another example, concealed object detectors are useful to detect objects concealed from view by fog, darkness, or other environmental factors.

2. Description of the Prior Art

One prior art concealed object detector employs the principle of establishing a magnetic field at a detection station. When a person or container concealing a metallic object enters the field, the field intensity is varied. This variation in field intensity is detected to provide an audio or visual indication. One of the problems associated with this type of magnetic field detector is that it detects only metallic objects and cannot always distinguish between one metallic object, say a pistol, and another metallic object, say a fountain pen.

Another prior art technique employs X-rays in a fluoroscopic type detector. The problem with this type of detector is that the X-rays are injurious to human tissue and can only be safely employed to detect objects concealed in containers. Another problem with the X-ray technique is that it tends to expose undeveloped film which may be in a traveler's suitcase. In addition, the X-ray negatives require time for development, thereby resulting in delays at transportation terminals.

BRIEF SUMMARY OF INVENTION

An object of the present invention is to provide novel and improved apparatus for detecting objects or substances which are concealed or hidden from view.

Another object is to provide hidden object detection apparatus which detects metallic as well as nonmetallic objects.

Still another object is to provide novel hidden object detection apparatus which provides a visual display in real time of concealed objects, thus providing a recognition as well as detection capacity.

Yet another object is to provide novel and improved concealed object detection apparatus which can be safely used to detect weapons concealed from view by a human being.

A further object is to provide novel and improved microwave photography apparatus.

In brief, concealed object detection apparatus embodying the invention includes a microwave energy source for illuminating a target with microwave energy. A microwave energy focussing element is employed to focus microwave energy which is reflected by the target to a focal plane. An energy converter element disposed within the focal plane converts the reflected microwave energy to thermal energy. A display then responds to the thermal energy for providing a visual display of images of the target and substances or objects concealed thereby.

In a preferred embodiment, the converter element includes a sheet of resistive material in which the reflected microwave energy sets up currents at various locations therein. These various locations of the sheet dissipate heat of intensities in proportion to the intensity of incident microwave energy. A layer of liquid crystals is affixed to the resistive sheet so as to respond to the thermal energy to display the images.

BRIEF DESCRIPTION OF THE DRAWING

In the accompanying drawing, like reference characters denote like elements of structure; and FIG. 1 is an elevation view of concealed object detection apparatus embodying the invention as employed at an exemplary target inspection station;

FIG. 2 is a block diagram of concealed object detection apparatus embodying the invention;

FIG. 3 is a sectional view of the energy conversion element and liquid crystal display taken along the lines 3—3 of FIG. 1; and FIG. 4 is a block diagram view of a further embodiment for obtaining visual images of the reflected microwave energy incident upon the energy conversion element.

DESCRIPTION OF PREFERRED EMBODIMENT

Concealed object detection apparatus embodying the invention may be employed in any situation where it is desired to detect objects or substances which are concealed from view. The principle employed is to illuminate with microwave energy a target area which may contain objects or substances concealed from view. The wavelength of the microwave energy is selected so that the illuminating energy can penetrate such concealing factors as fog, darkness, cloth and other materials. Such penetration capability is possessed by wavelengths in the millimeter range (i.e., on the order of 20 to 100 GigaHertz).

Different objects or substances in the target area will reflect different amounts or intensities of the incident microwave energy so as to produce a variable density radiation pattern. Apparatus embodying the invention employs an energy conversion element to convert the microwave radiation pattern at the focal or image plane of a focussing system to a thermal energy pattern having a variable heat density proportional to the reflected radiation pattern. A display means is employed to convert the variable density thermal pattern to a visual image pattern of the objects or substances in the target area.

With reference now to FIG. 1, there is shown a concealed object detection embodiment of the invention which is useful for security inspections as, for example, at a transportation terminal such as an airport. One of the problems of airport security is the detection and identification of concealed weapons before passengers and their luggage board an aircraft. In FIG. 1, the target is shown as a passenger 10 who is illuminated by or subjected to incident microwave energy beamed from a microwave antenna element 11. A wide angle focussing element 12 serves to focus the reflected microwave radiation pattern to or on a focal or image plane 13. Located in the image plane 13 is an energy conversion element 14 which converts the variable density microwave radiation pattern to a variable density thermal pattern. A display means 15 which is preferably a layer of liquid crystals converts the variable density thermal pattern to a visual image pattern of the passenger 10 and of any concealed objects such as the piston 16. A viewing channel 18 permits the visual image to be viewed as indicated by the eye 19 of an observer. A light illuminator (not shown) may be required to view the image in low ambient light conditions.

For a more detailed showing of energy converter 14 and liquid crystal display 15, reference is made to the enlarged cross-sectional view of FIG. 3 which is taken along the lines 3—3 of FIG. 1. The energy converter element 14 is a layer, sheet or film of resistive material, which according to one design may have a resistivity of 377 ohms per square. The liquid crystal display includes a transparent plastic material 15a in which a layer of liquid crystals 15b is embedded. A plane metallic backing sheet 17 is spaced one fourth of wavelength ($\lambda/4$) behind the resistive sheet 14. The backing sheet helps to assure the conversion of substantially all the incident energy to heat. The intervening space is filled with a low-loss dielectric filler material 52, such as polyfoam. The sandwich structure of the transparent plastic 15a, resistive sheet 14, filler material 52 and backing plate 17 can be affixed to one another as by laminating or bonding.

The reflected microwave radiation pattern which is focussed on the image plane 13 passes through the plastic layer 15a and embedded liquid crystal layer 15b and sets up currents in sheet 14. The current density at each point of sheet 14 is proportional to the intensity of the radiation incident thereto such that the heat dissipated results in a thermal pattern having a spatially distributed intensity. Because the color of light scattered from the liquid crystal layer varies with temperature, distinct color lines surround those areas of the liquid crystal layer through which microwave energy of substantially uniform intensity passes so as to form images of the target and any concealed objects.

The focussing element 12 is shown in FIG. 1 to be a Schmitt wide angle microwave lens system in order to capture a wide angle or large picture area of the target. For some applications, narrower viewing angles may be permissible, in which case other microwave focussing elements such as the Fresnal lens type may be employed. The focussing element 12 includes a metallic spherical reflector 12a and a molded polyfoam corrector element 12b arranged to capture the reflected microwave energy pattern from target 10 and focus the pattern on the imaging plane 13. For the illustrated spherical lens element 12, the image plane 13 and the energy converter and liquid crystal sandwich are also spherical. Of course, for other designs not employing spherical reflectors the image plane may take on other shapes.

The security inspection station illustrated in FIG. 1 includes a suitable platform 20 upon which is mounted an enclosure 21. One side of enclosure 21 has been broken away in order to illustrate the microwave focussing element 12 and image plane 13. The spherical reflector 12a, corrector element 12b, and energy converter and liquid crystal sandwich are mounted within the enclosure 21 by any suitable means (not shown). The microwave radiating antenna 11 is mounted on the enclosure 21. A control panel 22 is provided to permit the observer or operator to employ various operating modes as discussed hereinafter.

The target or passenger 10 is positioned on a revolvable plate 23 driven by a motor 24. The motor 24 is mounted on the underside of platform 20. By rotating plate 23, the passenger 10 can be illuminated from more than one direction. The platform 20 can be made mobile as by means of wheels 25.

Referring now to FIG. 2, there is shown a block diagram of the electrical control of the concealed object detector embodying the invention. As there shown, an oscillator 26 is coupled to drive the antenna element 11. The oscillator 26 includes a suitable oscillator device such as a traveling wave tube operable at millimeter wavelengths. The oscillator 26 is arranged for either continuous wave operation or pulsed operation in various modes by means of switches 30, 31 and 32 which may be located on control panel 22. When switch 30 is closed, a source of potential B+ is coupled to a power supply 27. The power supply 27 includes a coupler unit (not shown) which responds to the B+ potential to continuously couple operating power to the oscillator 26 so as to produce a continuous wave (cw) of energy.

For the continuous wave mode of operation the operator can control the rotation of target plate 23 by means of a switch 34. When switch 34 is closed, the B+ potential is coupled to a motor drive circuit 33. The motor drive 33 includes suitable driver circuits for motor 24 as well as an enabling unit responsive to the closure of switch 34. Several operating modes are possible. For example, the continuous wave could be applied continuously for one entire revolution of plate 23. On the other hand, the operator may prefer to use switch 34 to rotate the target to a desired position, hold that position, and then close switch 30 to provide a continuous wave of energy.

The switches 31 and 32 provide flash type operation. Thus when switch 31 is closed, a modulator 35 is enabled to couple operating power from power supply 27 to oscillator 26 for a short time interval so as to generate a pulse of microwave energy. Again the operator may control the target position by means of switch 34. When switch 32 is closed, the system is placed in an automatic flash sequence. A suitable sensor switch 53, for example, a weight pressure switch on plate 23, closes when passenger 10 has assumed his position on the plate. Motor drive 33 is enabled by the B+ potential to rotate plate 23. The motor drive 33 or plate 23 cooperates with a flash sequence generator 36 to produce a sequence of, say four, timing signals which drive modulator 35. For example, plate 23 may include four notches arranged at its periphery, 90° apart from one another. As each notch passes a stationary light source, a light sensor is activated to produce the four timing signals, the light source and sensor not being shown specifically but forming a part of the flash sequence generator 36. For this type of arrangement four flash pictures of the target would be obtained at orientations of 90° apart during each revolution of plate 23. The connection of switch 34 to flash sequence generator 36 is to inhibit (for example, hold the light source off) when the target plate is being rotated for continuous wave or manual flash operation.

The image pattern displayed by the liquid crystal layer 15b can also be viewed indirectly. Thus, there is shown in FIG. 2 a vidicon 37 which may be arranged to capture the display images from focal plane 13 via viewing channel 18 (FIG. 1). The signal produced by vidicon 37 is fed to a video tape recorder 38 for storage on magnetic tape. The recorder 38 includes playback means (not shown) for reproducing the stored images for viewing on a television monitor 39. Synchronism between vidicon 37, recorder 38, TV monitor 39 and the switches 30 to 33 is provided as indicated by the dashed line 40. This type of operation may be required to provide a visible "still" picture of a flash or pulse of microwave energy as the pulse duration is too short for the human eye 19 to retain the pulsed images focussed to focal plane 13.

Still referring to FIG. 2, a dashed line 41 is shown to indicate that more than one antenna 11 can be driven by oscillator 26. Thus, the same target 10 can be illuminated by more than one antenna. On the other hand, oscillator 26 could drive plural antennas simultaneously to illuminate several targets at the same time. Moreover, oscillator 26 could be time shared by several inspection stations.

Referring next to FIG. 4, there is shown a further embodiment of the invention in which the heat pattern produced by conversion element 14 is converted to a visible display by an IR area detector such as line scan unit 45. One simple form of an IR line scan unit utilizes two oscillating mirrors 46 and 47 to form an X-Y scanned infrared beam impinging on an infrared detector 48. An enclosure 49 and a baffle 50 restrict undesirable thermal radiation from detector 48. An amplifier 51 is coupled to detector 48 to provide sufficient video signal to drive tape recorders and TV monitors.

There has been described detection apparatus embodying the invention in which a millimeter wave energy pattern of a target area is focussed on a focal plane where it is converted to a thermal energy pattern. A display device responds to the thermal energy pattern to provide a visual image pattern of the target area. Images of substances, such as metallic weapons, pyrotechnics and others, which may be concealed from view in the target area are contained in the visual image pattern. The illustrated embodiments, though preferred, are by way of example, and other embodiments are possible for the described application as well as for other applications.

What is claimed is:

1. Apparatus for detecting surface and subsurface objects comprising:
    means for illuminating said objects with microwave energy whereby said objects reflect a microwave energy pattern;
    an energy focussing element for focussing said reflected energy pattern on a focal plane;
    an energy converter element including a sheet of resistive material disposed within said plane to convert said reflected microwave energy pattern to a thermal energy pattern; and
    display means including a layer of liquid crystal material affixed to said resistive sheet so as to respond to the thermal energy pattern produced by said resistive sheet in response to said reflected microwave energy pattern to display a visual image pattern of said objects.

2. Apparatus as set forth in claim 1
wherein illuminating means includes
    a. an antenna element positioned to radiate energy toward said objects, and
    b. an oscillator arranged to feed millimeter wave energy to said antenna element.

3. Apparatus as set forth in claim 2 and further including
    a modulator coupled to said oscillator for providing pulsed operation thereof whereby said objects are illuminated by flashes of millimeter wave energy.

4. Apparatus as set forth in claim 3 and further including
    a television monitor,
    storage means for recording said visual image pattern and for playing back said stored pattern for display on said monitor.

5. Apparatus as set forth in claim 3 and further including
    a rotatable plate upon which the objects are positioned;
    means for rotating said plate; and
    means for operating said modulator in synchronism with the rotating means.

6. Apparatus as set forth in claim 2 and further including
    a rotatable plate upon which the objects are positioned;
    means for rotating said plate; and
    means for operating said oscillator to provide said millimeter wave energy as a continuous wave.

7. Apparatus for detecting surface and subsurface objects comprising:
    means for illuminating said objects with microwave energy whereby said objects reflect a microwave energy pattern;
    an energy focussing element for focussing said reflected energy pattern on a focal plane;
    an energy converter element including a sheet of resistive material disposed within said plane to convert said reflected microwave energy pattern to a thermal energy pattern; and
    display means including
    a. an IR detector for scanning said thermal energy pattern to produce a video signal, and
    b. a television monitor responsive to said video signal to display a visual image pattern of said objects.

8. Apparatus as set forth in claim 7
wherein illuminating means includes
    a. an antenna element positioned to radiate energy toward said objects, and
    b. an oscillator arranged to feed millimeter wave energy to said antenna element.

9. Apparatus as set forth in claim 8 and further including
    a modulator coupled to said oscillator for providing pulsed operation thereof whereby said objects are illuminated by flashes of millimeter wave energy.

* * * * *